United States Patent [19]
Goldner

[11] Patent Number: 4,586,408
[45] Date of Patent: May 6, 1986

[54] PLASTIC PIPE CHAMFERING TOOL

[76] Inventor: Erwin P. Goldner, 2727 Felton St., San Diego, Calif. 92104

[21] Appl. No.: 701,342

[22] Filed: Feb. 13, 1985

[51] Int. Cl.$^4$ .............................................. B23B 5/16
[52] U.S. Cl. ..................................... 82/4 C; 144/205; 408/82; 408/211
[58] Field of Search ................... 408/82, 211, 22, 1 R, 408/241 R; 144/205; 82/4 C

[56]  References Cited
U.S. PATENT DOCUMENTS

| | | | |
|---|---|---|---|
| 3,232,145 | 2/1966 | Wilson | 408/211 X |
| 3,391,588 | 7/1968 | Brown | 408/1 X |
| 3,595,107 | 7/1971 | Dackow | 408/211 X |
| 3,817,649 | 6/1974 | Medney | 408/211 |
| 3,870,432 | 3/1975 | Strybel | 408/211 X |
| 4,240,771 | 12/1980 | Derbyshire | 408/241 R X |
| 4,362,446 | 12/1982 | Bell | 408/211 |

Primary Examiner—Z. R. Bilinsky
Attorney, Agent, or Firm—Charmasson & Holz

[57] ABSTRACT

A tool for chamfering the ends of plastic pipe of various diameters comprising a main body having various concentric circular grooves of different diameters which are shaped and sized to receive the square-cut ends of standard size plastic pipe. Each circular groove has an associated cutting blade mounted transversely with respect to the circumference of the pipe in a recess on the outer surface of the main body and positioned so that as the tool is rotated about the square-cut end of a pipe inserted in its correspondingly-sized groove, a chamfer is cut on the outer circular edge of the pipe. During the chamfering process, cuttings cannot enter the pipe because the open end of the pipe is covered by the tool and cuttings leave the tool through the recess. Cutting automatically ceases when the pipe end becomes seated in the groove.

7 Claims, 6 Drawing Figures

PLASTIC PIPE CHAMFERING TOOL

FIELD OF THE INVENTION

The present invention relates to devices for grinding or cutting a conical chamfer on the end of square-cut cylindrical objects.

BACKGROUND OF THE INVENTION

The use of plastic pipe is becoming increasing common in the construction industry because of its ease of installation, low cost and non-corrosive nature. Plastic pipe sections are commonly joined with slip-fit molded couplings which are bonded to the pipe sections with heat or plastic cement. The use of such couplings necessitates the chamfering of the ends of the pipe so that they may be easily inserted into the couplings. There are certain basic problems inherent in the chamfering tools now in use.

One problem is the inconvenience of having to carry a separate chamfering tool for each size of pipe.

Shavings created in the chamfering process pose another problem. When the pipes are used for transporting natural gas, for example, a small shaving or chip of plastic could be carried to a metering orifice, causing a blockage or reduction in the flow of the gas. As a result of this problem, it is common for pipe fitters to plug the end of the pipe during the chamfering operation. This is inconvenient and takes time.

An additional problem with contemporary chamfering tools is the lack of a limit gauge to prevent over-chamfering of the pipe end.

SUMMARY OF THE INVENTION

A first object of the invention is to provide a single chamfering tool for multiple sizes of plastic pipe. This has been accomplished by creating a chamfering tool body having various concentric circular grooves of different diameters which are shaped and sized to receive the square-cut ends of standard size plastic pipe. Each circular groove has an associated cutting blade mounted transversely with respect to the circumference of the pipe in a recess on the outer surface of the main body and positioned so that as the tool is rotated about the square-cut end of a pipe inserted in its correspondingly-sized groove, a chamfer is cut on the outer circular edge of the pipe.

The problem of cuttings from the chamfered edge entering the interior of the pipe has been solved by maintaining the pipe end covered by the tool body during the chamfering process. In order to further reduce the possibility of cuttings entering the pipe, the cuttings are expelled through the blade recess as they are shaved from the pipe edge.

The problem of over-chamfering is solved by the invention because cutting automatically ceases when the pipe end becomes seated in the groove.

DESCRIPTION OF THE PREFERRED EMBODIMENT OF THE INVENTION

Figure 1:
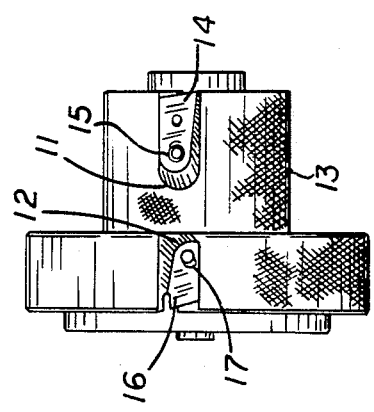
FIG. 1 is a side elevational view of the chamfering tool.

Referring now to FIG. 1, a first blade-mounting recess 11, a second blade-mounting recess 12 and a third blade-mounting recess 21 (not shown in FIG. 1) are cut in a radially-symmetrical tool body 13. A first blade 14 is secured to the bottom of first recess 11 by means of first retaining screw 15, while a second blade 16 is secured to the bottom of second recess 12 by means of second retaining screw 17.

Figure 2:
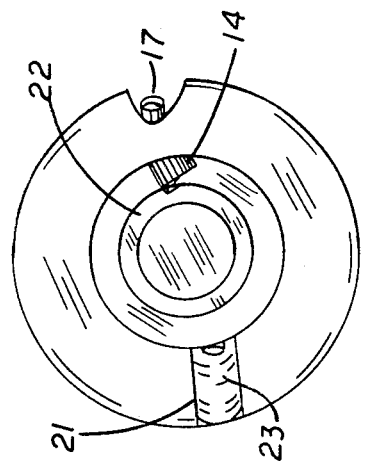
FIG. 2 is an elevational view of the minor end of the chamfering tool.

In FIG. 2, recess 21 is partially visible. Also shown in this Figure is first concentric circular groove 22, which is cut into the minor end of tool body 13, said first groove being shaped and sized to receive a first size of plastic pipe. The cutting edge of first blade 14 protrudes through recess 11 into first groove 22, being angled to cut a chamfer of approximately thirty degrees on the end of a pipe which matches this groove when the pipe end is inserted the groove and rotated about its axis. Shaving produced by the chamfering process are expelled from the tool body 13 through recess 11. The heads of second blade retaining screw 17 and of third blade retaining screw 23 are also partially visible.

Figure 3:
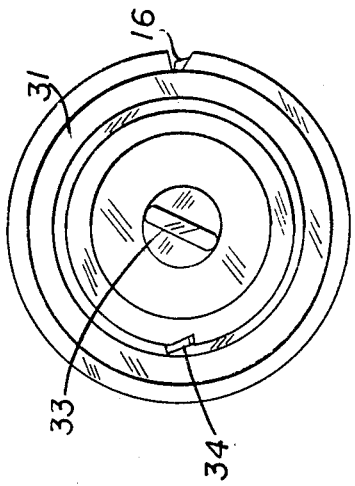
FIG. 3 is an elevational view of the major end of the chamfering tool.

At the opposite major end end of tool body 13, visible in FIG. 3, second concentric circular groove 31 and third circular groove 32 can be clearly seen. These grooves is shaped and sized to receive a second and third sizes, respectively, of plastic pipe. Plug 33 may be removed to expose a spare-blade-retaining chamber 41 (shown in the cross-sectional view of FIG. 4). Second blade 16 and third blade 34 are fastened at the bottom of second recess 12 and third recess 21, respctively, their cutting edges also being angled to cut a chamfer of approximately thirty degrees. Cuttings from both second blade 16 and third blade 34 are also expelled from tool body 13 through their respective recesses.

Figure 4:
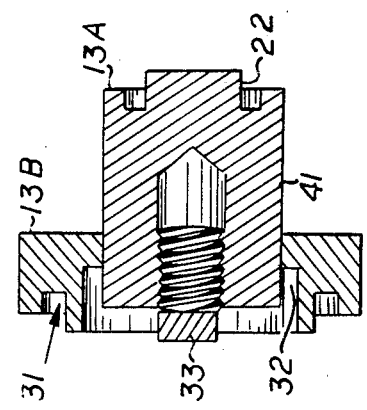
FIG. 4 is a cross-sectional view of the chamfering tool taken along line 4—4 of FIG. 3.

The cross-sectional view of FIG. 4 illustrates the two sections of tool body 13, an inner section 13A and an outer section 13B. Body 13 was constructed from two separate pieces press-fitted together in order to facilitate manufacture. The configuration of grooves 22, 31 and 32 is cleary shown in this view.

Figure 5:
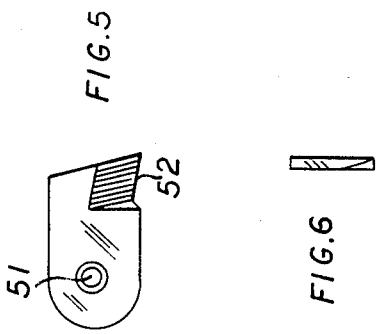
FIG. 5 is a top plan view of one of the blades.
Figure 6:
FIG. 6 is a side elevational view of one of the blades, taken from the cutting end.

Blades 14, 16 and 34 are identical. The configuration of the blade is shown by the top plan view of FIG. 5 in which the holde 51 for the retaining screw and the cutting edge 52 are clarly shown. FIG. 6 shows the blade from the cutting end.

While the preferred embodiment of the invention has been described, other embodiment may be devised and modifications may be made thereto without departing from the spirit of the invention and the scope of the appended claims. For example, a tool may be constructed using the techniques disclosed herein for chamfering the inner circular edges of square-cut ends of different sizes of plastic pipe. Additionally, by using two blades and two recesses per circular groove, a tool may be constructed for simultaneously chamfering both the inner and outer circular edges of the end of a plastic pipe.

What is claimed is:

1. A tool for chamfering square-cut ends of plastic pipe comprising:
   a main body having a first circular groove shaped and sized to receive a first size of plastic pipe;

a cutting blade mounted in a recess connecting the exterior surface of said main body with the periphery of said first groove;

said blade being positioned transversely with respect to the circumference of a pipe of said first size inserted in said first groove;

said blade also being positioned and angled to cut a chamfer on the end of a pipe of said first size inserted in said first groove when said tool is axially rotated about said end and pressure is exerted on said tool in an axial direction toward said pipe end; and said recess and blade being angled and positioned to expell cuttings from the chamfering process from said main body through said recess.

2. The tool of claim 1 wherein said main body is essentially radially symmetrical about a longitudinal axis, said body having two parallel faces at opposite ends of said longitudinal axis.

3. The tool of claim 2 wherein said first circular groove is formed on one of said two parallel faces, said first circular groove being radially symmetrical about said longitudinal axis.

4. The tool of claim 3 wherein said main body has at least one additional circular groove positioned concentrically with respect to said first groove on the same face with said first groove;

each additional circular groove being sized and shaped to receive a different size of plastic pipe;

said main body having an additional recess and an additional blade mounted therein associated with each additional groove; and said at least one additional circular groove and associated recess and associated blade being positioned to chamfer a pipe in a manner identical to that employed by said at least one blade and said at least one recess.

5. The tool of claim 3 wherein said main body has at least one additional circular groove on the opposite face;

said at least one additional circular groove being radially symmetrical about said longitudinal axis;

each additional circular groove being sized and shaped to receive a different size of plastic pipe;

said main body having an additional recess and an additional blade mounted therein associated with each additional groove; and said at least one additional circular groove and associated recess and associated blade being positioned to chamfer a pipe in a manner identical to that employed by said at least one blade and said at least one recess.

6. The tool of claim 3 wherein said main body has a chamber located in its hub, said chamber being shaped and dimensioned to receive spare cutting blades.

7. The tool of claim 6 which further comprises a threaded entrance to said chamber, and a threaded plug which may be screwed into said threaded entrance in order to retain said spare cutting blades within said chamber.

* * * * *